(12) United States Patent
White

(10) Patent No.: US 8,281,254 B2
(45) Date of Patent: *Oct. 2, 2012

(54) MENU PROMOTIONS USER INTERFACE

(75) Inventor: Scott White, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 309 days.

This patent is subject to a terminal disclaimer.

(21) Appl. No.: 12/638,026

(22) Filed: Dec. 15, 2009

(65) Prior Publication Data

US 2010/0095243 A1  Apr. 15, 2010

Related U.S. Application Data

(63) Continuation of application No. 11/204,287, filed on Aug. 15, 2005, now Pat. No. 7,657,843.

(51) Int. Cl.
G06F 3/048 (2006.01)

(52) U.S. Cl. ........ 715/810; 715/817; 715/818; 715/819; 715/820; 725/2; 725/8; 725/39; 725/40; 725/41; 725/42

(58) Field of Classification Search .................. 715/810, 715/813, 817–822, 827, 829, 830, 831, 847; 725/2, 4, 8, 39–61
See application file for complete search history.

(56) References Cited

U.S. PATENT DOCUMENTS

| 5,479,268 | A | * | 12/1995 | Young et al. | 386/291 |
| 5,805,235 | A | | 9/1998 | Bedard | |
| 6,038,545 | A | | 3/2000 | Mandeberg et al. | |
| 6,757,906 | B1 | * | 6/2004 | Look et al. | 725/45 |
| 7,552,458 | B1 | * | 6/2009 | Finseth et al. | 725/34 |
| 7,757,252 | B1 | * | 7/2010 | Agasse | 725/41 |
| 2002/0163543 | A1 | | 11/2002 | Oshikiri | |
| 2005/0235319 | A1 | * | 10/2005 | Carpenter et al. | 725/52 |
| 2005/0246738 | A1 | * | 11/2005 | Lockett et al. | 725/43 |
| 2006/0069623 | A1 | | 3/2006 | MacDonald Korth et al. | |
| 2006/0206913 | A1 | | 9/2006 | Jerding et al. | |
| 2007/0038957 | A1 | | 2/2007 | White | |

* cited by examiner

Primary Examiner — Weilun Lo
Assistant Examiner — Rashedul Hassan
(74) Attorney, Agent, or Firm — Toler Law Group, PC

(57) ABSTRACT

A computer implemented method is disclosed. The method includes determining, at a set-top box device, that a plurality of menu items in a menu includes a particular menu item associated with a content item that is to be promoted when displaying the plurality of menu items in the menu. The method further includes displaying the plurality of menu items in the menu. A determination is made at the set top box whether to display a promotion of the content item. In response to determining to display the promotion, the promotion of the content item is displayed beside the plurality of menu items, and a right command is enabled allowing a cursor position to jump directly to the particular menu item from a different menu item of the plurality of menu items. The jump is performed after a single application of the right command, where the different menu item does not have a restriction as to a position in the menu. In response to determining not to display the promotion, the right command is disabled.

20 Claims, 6 Drawing Sheets

MENU PROMOTIONS USER INTERFACE

CROSS-REFERENCE TO RELATED APPLICATION

This application is a continuation of and claims priority from U.S. patent application Ser. No. 11/204,287, now issued as U.S. Pat. No. 7,657,843, filed Aug. 15, 2005, and entitled "MENU PROMOTIONS USER INTERFACE," which is incorporated herein by reference in its entirety.

FIELD OF THE DISCLOSURE

The present disclosure relates to user interfaces having a menu.

BACKGROUND

Video set-top boxes provide menus to enable users to navigate to content items of interest. Examples of the menus are shown in U.S. Patent Application Publication No. US 2003/0112467 A1. The aforementioned reference discloses a graphical user interface having a right menu region adjacent to a left menu region. The left menu region comprises selectable menu elements. The right menu region displays sub-elements associated with one of the selectable menu elements identified by a selection element.

BRIEF DESCRIPTION OF THE DRAWINGS

The present disclosure is pointed out with particularity in the appended claims.

DETAILED DESCRIPTION

Figure 1:
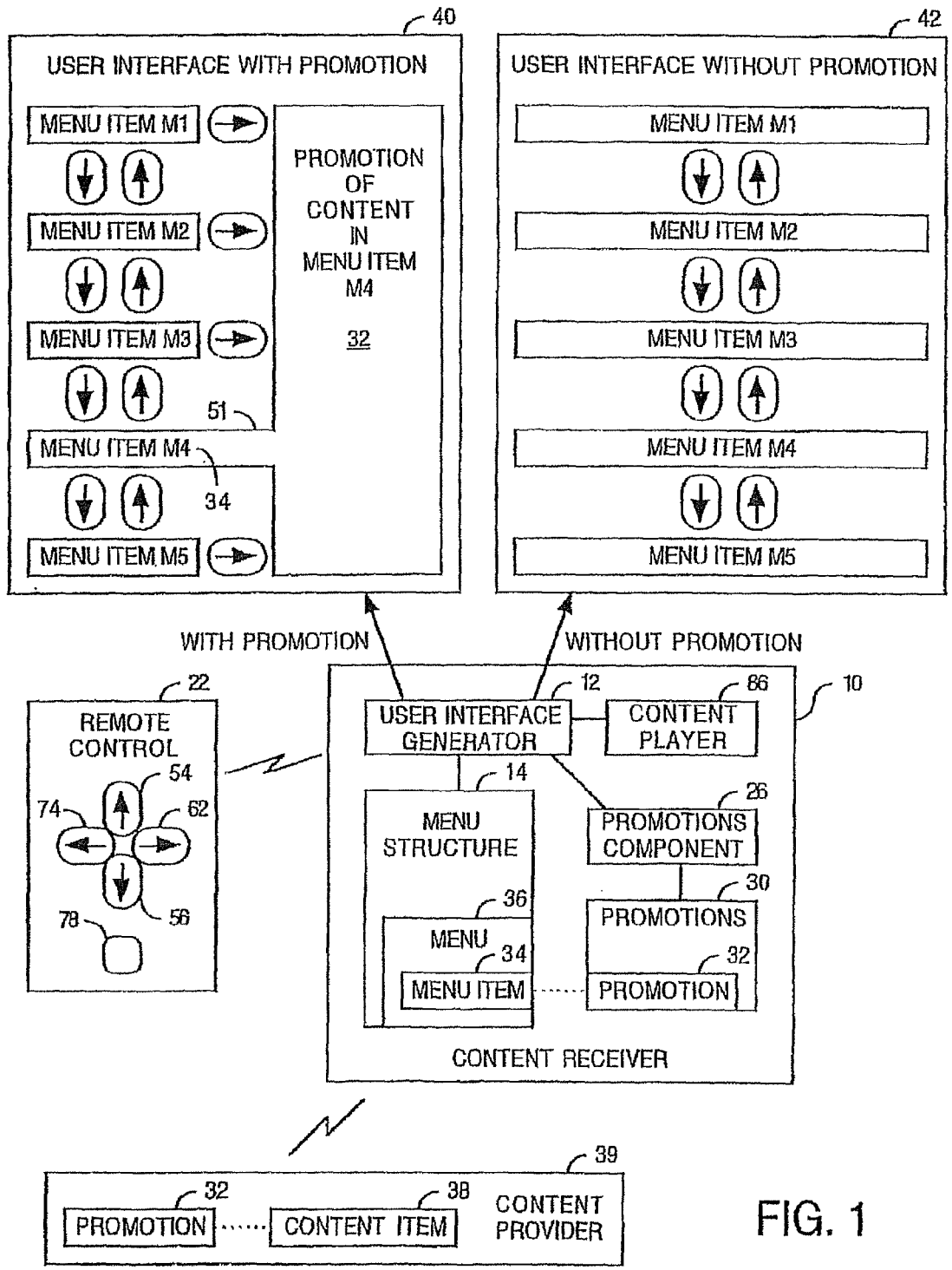
FIG. 1 is a block diagram of an embodiment of a system to promote a content item at a deeper level in a menu.

Disclosed herein are embodiments of menu-displaying user interfaces. If a menu includes a particular menu item that leads to a content item that is to be promoted, the user interface displays a promotion for the content item beside items in the menu. Up/down commands are provided to move a cursor position upward/downward by one menu item in the menu. Further, a right command is provided to move the cursor position to the particular menu item from any other one of the menu items. When the cursor position is at the particular menu item, the particular menu item and the promotion are both displayed with a cursor-position-indicating visual characteristic.

In a particular embodiment, a computer implemented method is disclosed. The method includes determining, at a set-top box device, that a plurality of menu items in a menu includes a particular menu item associated with a content item that is to be promoted when displaying the plurality of menu items in the menu. The method further includes displaying the plurality of menu items in the menu. A determination is made at the set top box whether to display a promotion of the content item. In response to determining to display the promotion, the promotion of the content item is displayed beside the plurality of menu items, and a right command is enabled allowing a cursor position to jump directly to the particular menu item from a different menu item of the plurality of menu items. The jump is performed after a single application of the right command. The different menu item does not have a restriction as to a position in the menu. In response to determining not to display the promotion, the right command is disabled.

In another embodiment, a set top box device is disclosed. The set top box device includes a processor and a computer readable medium coupled to the processor. The computer readable medium is configured to store a promotion component to determine that a plurality of menu items in a menu includes a particular menu item associated with a content item that is to be promoted when displaying the menu. The computer readable medium is further configured to store a user interface generator that is responsive to the promotion component. The user interface generator is to display the plurality of menu items in the menu and to determine whether to display a promotion of the content item. In response to determining to display the promotion, the user interface generator displays the promotion of the content item beside the plurality of menu items, and enables a right command allowing a cursor position to jump directly to the particular menu item from a different menu item of the plurality of menu items. The jump is performed after a single application of the right command. The different menu item does not have a restriction as to a position in the menu. In response to determining not to display the promotion, the right command is disabled.

In another embodiment, a computer readable storage medium is disclosed. The computer readable storage medium tangibly embodies a program of operational instructions, where the operational instructions are executable by a processor to determine that a plurality of menu items in a menu includes a particular menu item associated with a content item that is to be promoted when displaying the plurality of menu items in the menu. The operational instructions are executable by the processor to display the plurality of menu items in the menu and to determine whether to display a promotion of the content item. In response to determining to display the promotion, the operational instructions are executable by the processor to display the promotion of the content item beside the plurality of menu items and to enable a right command allowing a cursor position to jump directly to the particular menu item from a different menu item of the plurality of menu items, where the jump is performed after a single application of the right command, and where the different menu item does not have a restriction as to a position in the menu. In response to determining not to display the promotion, the operational instructions are executable by the processor to disable the right command.

Embodiments are described with reference to FIG. 1, which is a block diagram of an embodiment of a system, and FIG. 2, which is a flow chart of an embodiment of a method of promoting a content item accessible via a menu.

The system comprises a content receiver 10 that includes a user interface generator 12. The content receiver 10 receives content, such as video content and/or audio content, and plays the content to its users. The content may be audibly and/or visibly displayed by an audio output device and/or a visual display device. The audio output device and/or the visual display device may be either integrated with or external to the content receiver 10. Examples of the content receiver 10 with the user interface generator 12 include, but are not limited to, video set-top box receivers, digital video recorders, television receivers, personal computers, personal digital assistants, gaming devices (e.g. Sony's PLAYSTATION or Microsoft's X-BOX), and wireless telephones.

Selections of which content to receive and/or play are made using user interfaces generated by the user interface generator 12. The user interfaces enable users to navigate a menu structure 14 of multiple menus. Some or all of the multiple menus may be hierarchical in that a user selection of an item from one menu leads to another menu.

Figure 2:
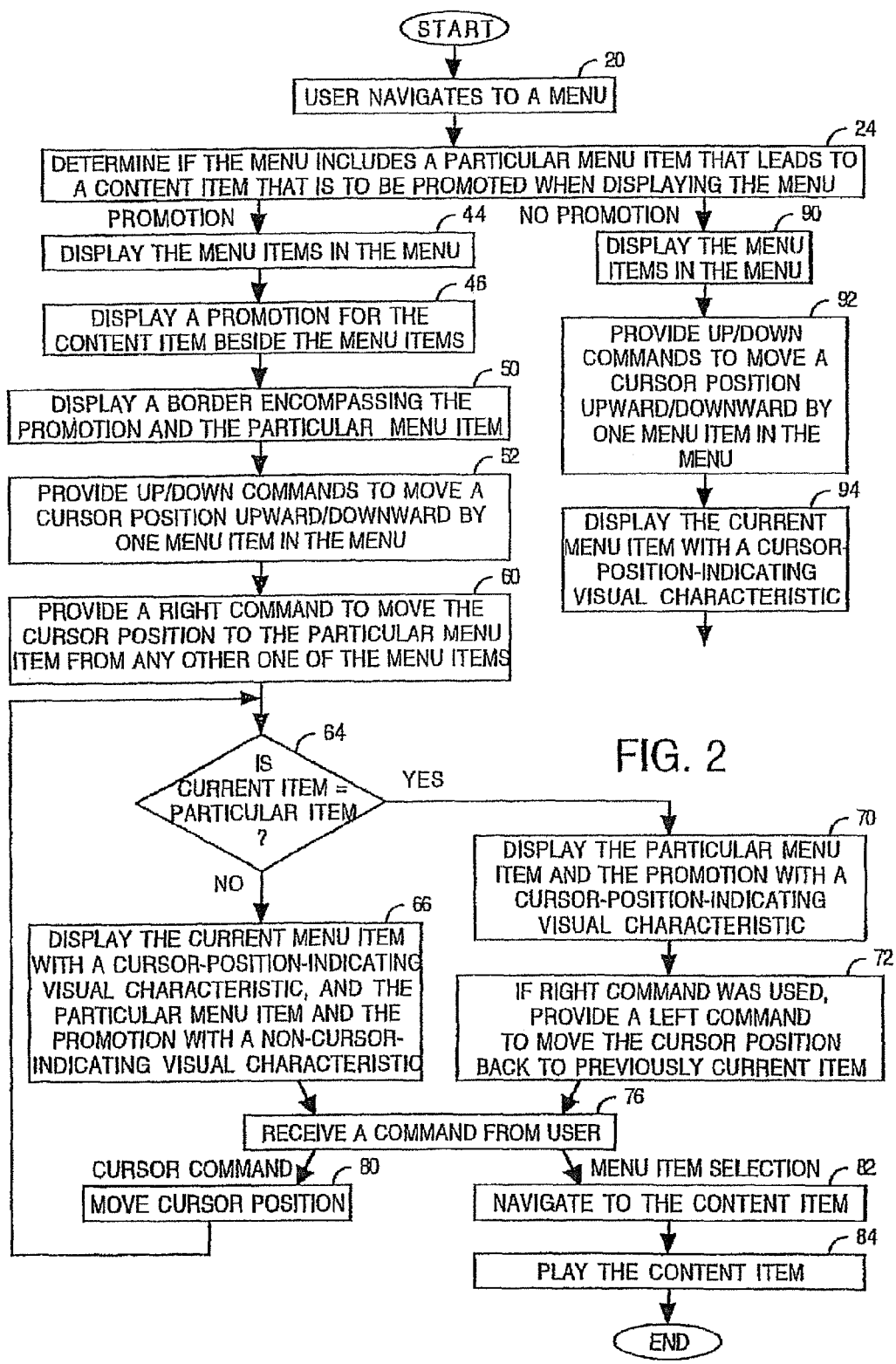
FIG. 2 is a flow chart of an embodiment of a method of promoting the content item with the menu.

FIG. 2 illustrates acts performed for a current menu to be displayed in a user interface generated by the user interface generator 12. Optionally, as indicated by block 20, the current menu is one to which a user has navigated in the menu structure 14. The menu structure 14 can be navigated in response to user inputs received by a remote control 22 or another user input device.

As indicated by block 24, the method comprises determining if the current menu includes a particular menu item that leads to a content item that is to be promoted when displaying the current menu. This act can be performed by a promotions component 26 of the content receiver 10. The promotions component 26 receives promotions 30 for content items that can be received and/or played by the content receiver 10.

Some or all of the promotions 30 are targeted to one or more particular menu items in one or more particular menus. Each promotion, with data identifying its targeted menu item(s) and/or data indicating an expiration date and time for the promotion, can be transmitted to the content receiver 10 by one or more content providers who provide the content items and/or by a network operator or another source.

For example, consider the promotions 30 including a promotion 32 targeted for display with a particular menu item 34 in a particular menu 36. The promotion 32 is for a content item 38 that is available from a content provider 39. Examples of the content item 38 include, but are not limited to, a video-on-demand item, a near-video-on-demand item, a broadcast video item, and an audio item. The content item 38 can be played after navigating one or more levels deeper into the menu structure 14 from the particular menu item 34.

If the promotions component 26 determines that the current menu includes the particular menu item 34, the user interface generator 12 generates a user interface 40 that displays the promotion 32. If the promotions component 26 determines that the current menu does not include the particular menu item 34, the user interface generator 12 generates a user interface 42 that is absent the promotion 32. Moreover, if the promotions component 26 determines that the current menu has no targeted menu items, the user interface 42 may be absent any targeted promotions.

If a content item is to be promoted when displaying the current menu, acts of displaying the menu items in the current menu and displaying a promotion for the content item beside the menu items are performed as indicated by blocks 44 and 46. The menu items may be displayed in a single column. The promotion may be adjacent to each of the menu items.

Preferably, the promotion is visually connected to the particular menu item that leads to the content item. As indicated by block 50, one way to visually connect the promotion with the particular menu item is to display a border that encompasses the promotion and the particular menu item. Other ways to visually connect the promotion with the particular menu item include displaying a line or an arc connecting the two.

For example, consider the current menu comprising menu items M1, M2, M3, M4 and M5, and the promotion 32 being for a content item in the menu item M4. In this example, the user interface generator 12 causes the user interface 40 to display the promotion 32 adjacent and to the right of the menu items M1, M2, M3, M4 and M5. The promotion 32 is visually connected to the menu item M4 by displaying a border 51 that encompasses the two.

As indicated by block 51, the user interface generator 12 provides up/down commands to move a cursor position upward/downward by one menu item in the displayed menu. The up/down commands can be initiated by a user using the remote control 22 or another user input device. The remote control 22 can include an up button 54 to make the up command, and a down button 56 to make the down command.

As indicated by block 60, the user interface generator 12 provides a right command to move the cursor position to the particular menu item (having the associated promotion) from any other one of the menu items. The remote control 22 can include a right button 62 to make the right command. Thus, in the above example, a user can press the right button 62 to move the cursor position to the menu item M4 from a previous position at any of the menu items M1-M5.

Different transitions for moving the cursor position are depicted in FIG. 1 by arrows within the user interface 40. In practice, the user interface 40 displayed to the user may or may not include these arrows.

As indicated by block 64, the user interface generator 12 determines if the cursor position is at the particular menu item having the associated promotion. It is noted that any menu item at which the cursor is currently positioned may be referred to as a current menu item.

When the cursor position is at a current menu item other than the particular menu item having the associated promotion, the user interface generator 12 displays the current menu item with a cursor-position-indicating visual characteristic, and displays the particular menu item and the promotion with a non-cursor-position-indicating visual characteristic (as indicated by block 66). The cursor and non-cursor visual characteristics may differ by their respective background colors, background patterns, background shades, border patterns, fonts, text sizes, underlining text, italicizing text, bolding text, flashing, or any combination thereof.

When the cursor position is at the particular menu item having the associated promotion, the user interface generator 12 displays both the particular menu item and the promotion with the cursor-position-indicating visual characteristic (as indicated by block 70).

Optionally, if the cursor position has been moved to the particular menu item using the right command, the user interface generator 12 can provide a left command to move the cursor position from the particular menu item back to the other menu item (as indicated by block 72). The remote control 22 can include a left button 74 to make the left command. Thus, in the above example, if the user has pressed the right button 62 to move the cursor position from the menu item M2 to the menu item M4, the user can thereafter press the left button 74 to move the cursor position back to the menu item M2.

As indicated by block 76, the user interface generator 12 can receive a command from the user. The command can include a cursor command, such as either the up command, the down command, the right command or the left command. Alternatively, the command can include a menu item selection command. The current menu item can be selected in response to the user pressing a selection button 78 of the remote control 22.

If a cursor command is received, the cursor position can be moved based on the cursor command (as indicated by block 80), and flow of the method is directed back to block 64.

If a menu item selection command is received, the user can navigate to deeper levels in the menu structure 14. Continuing with the above example, consider the user gaining interest in the content item 38 after having seen the promotion 32. As indicated by block 82, the user can select the particular menu item (and optionally make one or more additional commands) to navigate to the content item 38 in the menu structure 14. For example, the user can press the selection button 78 when the cursor position is at the menu item M4 to begin to navigate to the content item 38. Thereafter, as indicated by block 84, a content player 86 of the content receiver 10 can play the content item 38. This act may include retrieving the content item 38 from the content provider 39. The content item 38 may be communicated from the content provider 39 to the content receiver 10 via a network such as the Internet, a digital subscriber line (DSL) network, a cable-television-plant-based computer network, a wireless data network such as a 3G network, an intranet, an extranet, or any combination thereof.

Referring back to block 24, if no content item is to be promoted when displaying the current menu, the user interface generator 12 causes a display of the menu items in the current menu without displaying the promotion 32 (as indicated by block 90). For example, consider a time when the content item 38 is no longer to be promoted when displaying the menu items M1, M2, M3, M4 and M5. At this time, which may be after the user interface 40 has been displayed, the user interface 42 is generated and displayed. The user interface 42 displays the menu items M1, M2, M3, M4 and M5 without displaying the promotion 32 beside the menu items M1, M2, M3, M4 and M5.

As indicated by block 92, the user interface generator 12 provides up/down commands to move a cursor position upward/downward by one menu item in the displayed menu. The up/down commands can be initiated by a user using the up button 54 and the down button 56 of the remote control 22 or another user input device. However, the user interface generator 12 disables the right command that previously had enabled the user to move directly to the menu item M4 from any of the menu items M1-M5.

Different transitions for moving the cursor position are depicted in FIG. 1 by arrows within the user interface 42. In practice, the user interface 42 displayed to the user may or may not include these arrows.

As indicated by block 94, the user interface generator 12 displays the current menu item with the cursor-position-indicating visual characteristic, and displays the other items with the non-cursor-position-indicating visual characteristic. Subsequent acts of moving the cursor position based on cursor commands from the user, navigating to content in the menu structure, and playing the content may be performed. Thus, other than the right and left commands, the user can interact with the menu structure 14 in the same way regardless of whether or not a promotion is displayed.

Figure 3:
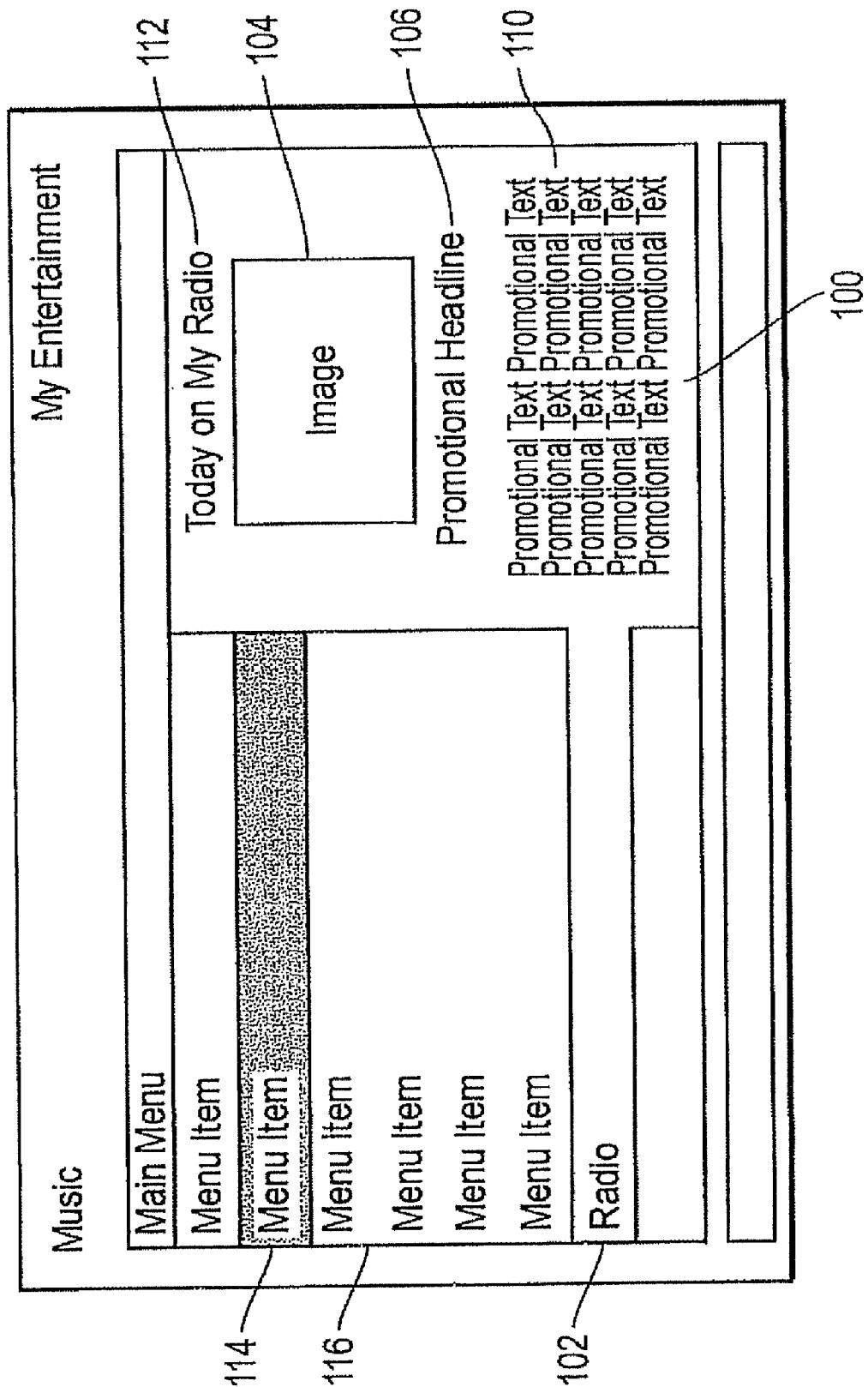
FIG. 3 is an illustration of an embodiment of a user interface that displays, beside multiple menu items, a promotion for a content item.
Figure 4:
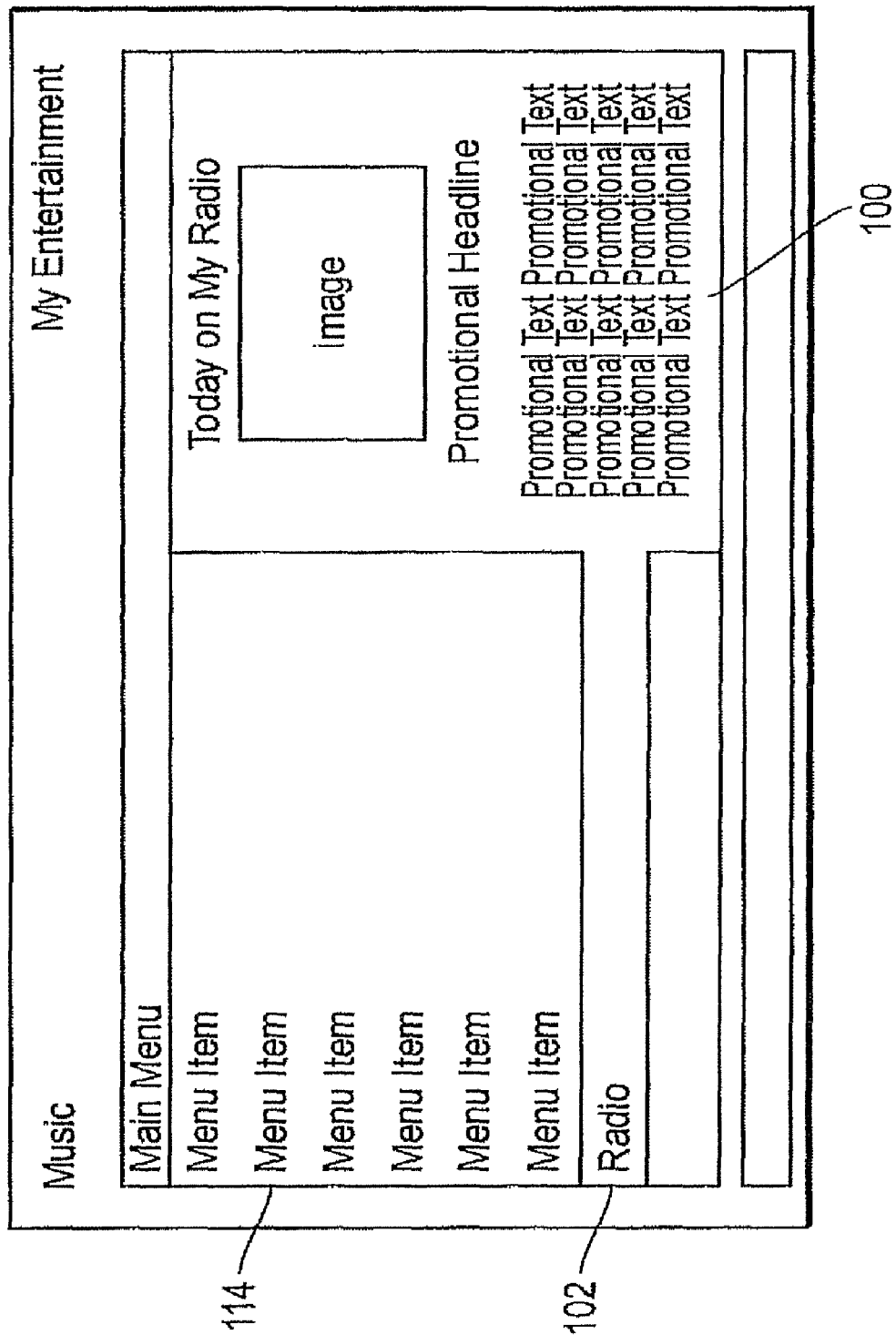
FIG. 4 is an illustration of an embodiment of the user interface of FIG. 3 when the cursor position is moved to the promotion.
Figure 5:
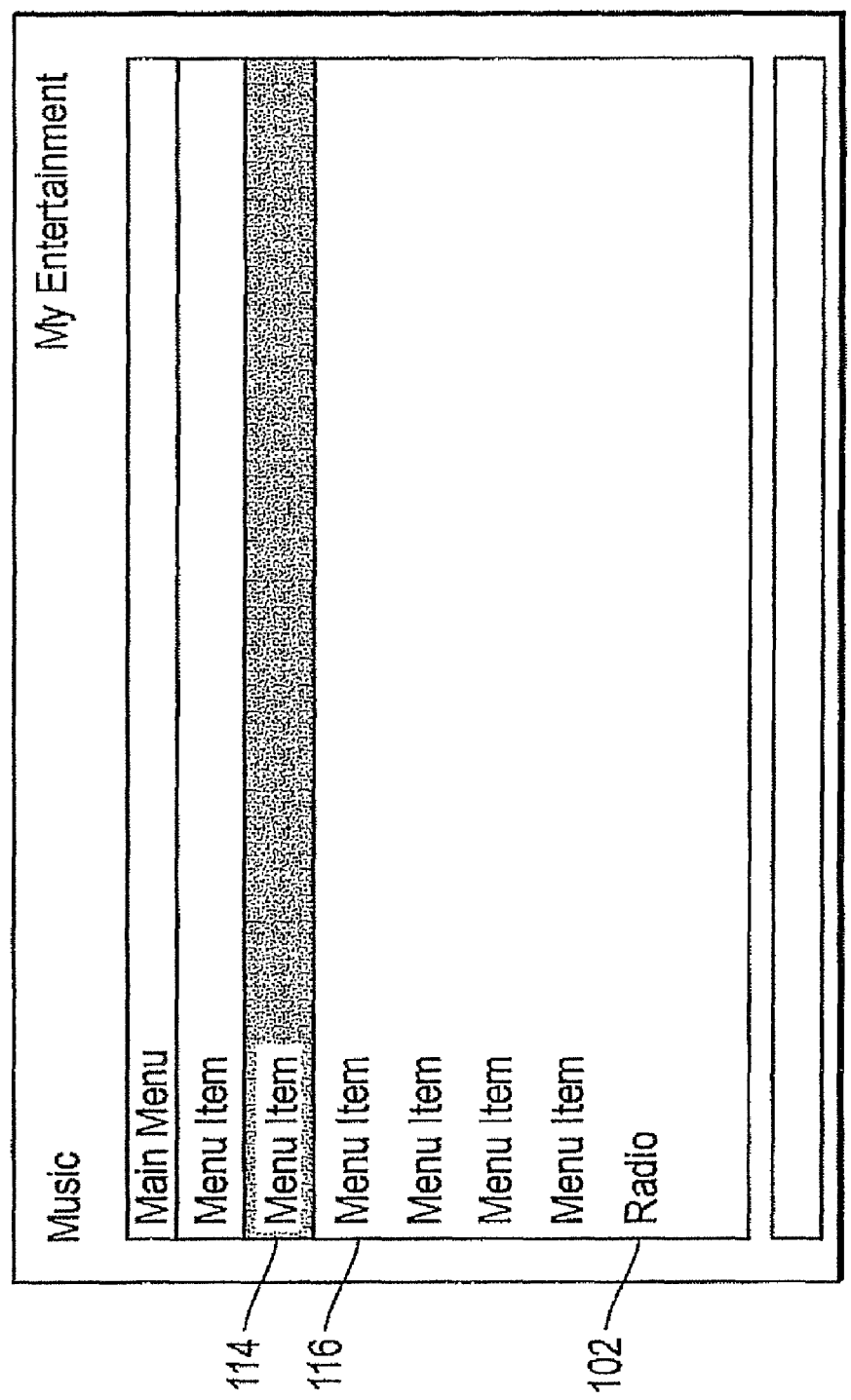
FIG. 5 is an illustration of an embodiment of a user interface when the content item is not promoted.

FIGS. 3 to 5 show examples of user interfaces generated by the user interface generator 12. These user interfaces are presented for illustrative purposes.

FIG. 3 is an illustration of an embodiment of a user interface that displays, beside multiple menu items, a promotion 100 for a content item. The promotion 100 is to direct a user to a particular menu item 102 where a promoted content item is available. The promotion 100 may include an image 104, a headline 106, promotional text 110, and text 112 to reinforce its relationship to the particular menu item 102.

In this illustration, the cursor position is at a menu item 114. Thus, the menu item 114 is displayed with a cursor-position-indicating background. Other menu items, including a menu item 116, the particular menu item 102 and the promotion 100, are displayed with a non-cursor-position-indicating background.

FIG. 4 is an illustration of an embodiment of the user interface of FIG. 3 when the cursor position is moved to the menu item 102 and the promotion 100. The cursor position can be moved from the menu item 114 to the menu item 102/promotion 100 by pressing the down button 56 five times, or by pressing the right button 62 once. The particular menu item 102 and the promotion 100 are displayed with the cursor-position-indicating background. Other menu items, including the menu item 114, are displayed with a non-cursor-position-indicating background.

FIG. 5 is an illustration of an embodiment of the user interface when the content item is not being promoted. In this case, the user interface displays the multiple menu items but is absent the promotion 100. In FIGS. 3 and 4, the promotion 100 is displayed in a part of the user interface that would otherwise comprise substantively empty space as shown in FIG. 5. The menu item 114 is displayed with the cursor-position-indicating background to indicate its having the cursor position.

Benefits of the herein-disclosed method and system include: (a) modularity, in that promotions can be added or removed from menu pages of a set-top box as a content provider or a network operator wishes; (b) familiarity, in that the user interacts with the menu structure in substantially the same way whether the promotion is present or not; (c) influence, in that the promotion directs the user to a certain menu item; and (d) relevance, in that the promotion is visually connected to the certain menu item where the content is available.

Figure 6:
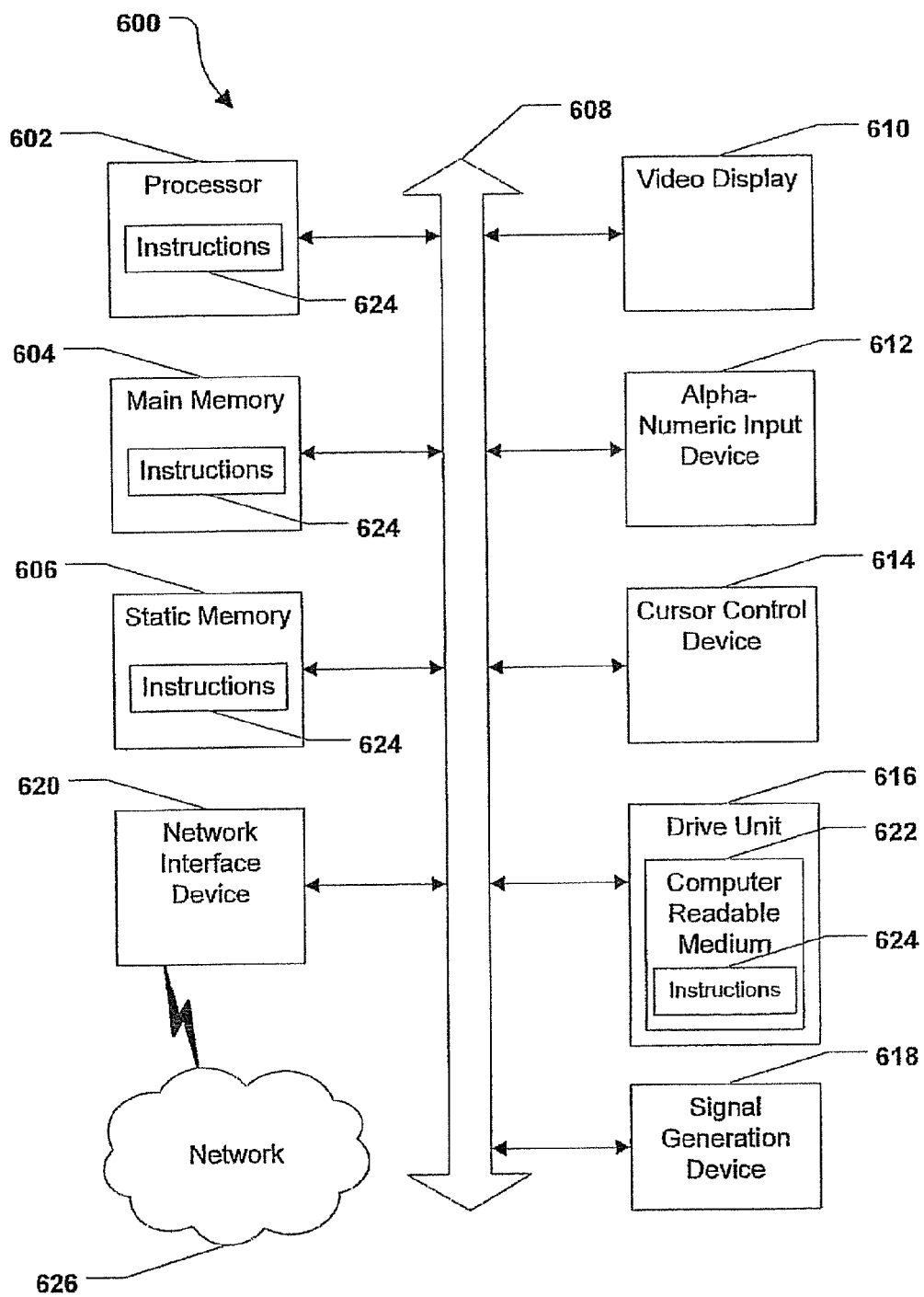
FIG. 6 includes an illustration of a general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer implemented method comprising:
   determining, at a set-top box device, that a plurality of menu items in a menu includes a particular menu item associated with a content item that is to be promoted when displaying the plurality of menu items in the menu;
   displaying the plurality of menu items in the menu;
   determining, at the set-top box device, whether to display a promotion of the content item;
   in response to determining to display the promotion:
      displaying the promotion of the content item beside the plurality of menu items; and
      enabling a right command allowing a cursor position to jump directly to the particular menu item from a different menu item of the plurality of menu items, the jump performed after a single application of the right command, wherein the different menu item does not have a restriction as to a position in the menu; and
   in response to determining not to display the promotion, disabling the right command.

2. The computer implemented method of claim 1, further comprising retrieving a promotional element of the promotion from a content source.

3. The computer implemented method of claim 1, further comprising receiving the right command when the cursor position is at the different menu item while the promotion is displayed.

4. The computer implemented method of claim 1, further comprising displaying the different menu item with a non-cursor-position-indicating visual characteristic when the right command is received.

5. The computer implemented method of claim 1, further comprising displaying a cursor-position-indicating border that encompasses the promotion and encompasses the particular menu item to visually connect the promotion to the particular menu item when the right command is received.

6. The computer implemented method of claim 1, wherein the plurality of menu items in the menu is displayed in a column.

7. The computer implemented method of claim 1, further comprising:
   receiving a left command when the cursor position is at the particular menu item;
   displaying the different menu item with a cursor-position-indicating visual characteristic; and
   displaying the particular menu item and the promotion with a non-cursor-position-indicating visual characteristic to visually disconnect the promotion from the particular menu item.

8. The computer implemented method of claim 1, further comprising:
   identifying a particular content player of a plurality of content players to play the content item based on a content item type; and
   playing the content item using the particular content player.

9. A set-top box device comprising:
   a processor;
   a computer readable medium coupled to the processor, the computer readable medium configured to store:
      a promotion component to determine that a plurality of menu items in a menu includes a particular menu item associated with a content item that is to be promoted when displaying the menu; and
      a user interface generator, responsive to the promotion component, to:
         display the plurality of menu items in the menu;
         determine whether to display a promotion of the content item;
         in response to determining to display the promotion:
            display the promotion of the content item beside the plurality of menu items; and
            enable a right command allowing a cursor position to jump directly to the particular menu item from a different menu item of the plurality of menu items, the jump performed after a single application of the right command, wherein the different menu item does not have a restriction as to a position in the menu; and
         in response to determining not to display the promotion, disable the right command.

10. The set top box device of claim 9, wherein the user interface generator is to move the cursor position to the particular menu item from the different menu item of the plurality of menu items in response to receiving the right command when the promotion for the content item is displayed.

11. The set top box device of claim 9, wherein the user interface generator is to display the different menu item with a non-cursor-position-indicating visual characteristic in response to receiving the right command.

12. The set top box device of claim 9, wherein the user interface generator is to display a link between the promotion and the particular menu item to visually connect the promotion to the particular menu item in response to receiving the right command.

13. The set top box device of claim 12, wherein the user interface generator is to move the cursor position from the particular menu item to the different menu item of the plurality of menu items in response to receiving a left command, to display the different menu item of the plurality of menu items with a cursor-position-indicating visual characteristic, and to display the particular menu item and the promotion without the link to visually disconnect the promotion from the particular menu item.

14. The set-top box device of claim 9, wherein the user interface generator is to display the plurality of menu items in the menu without displaying the promotion in response to the promotion component determining, at a time after displaying the promotion for the content item beside the plurality of menu items, that the content item is no longer to be promoted when displaying the menu.

15. A computer readable storage medium tangibly embodying a program of operational instructions, the operational instructions executable by a processor to:
   determine that a plurality of menu items in a menu includes a particular menu item associated with a content item that is to be promoted when displaying the plurality of menu items in the menu;
   display the plurality of menu items in the menu;
   determine whether to display a promotion of the content item;

in response to determining to display the promotion:
   display the promotion of the content item beside the plurality of menu items; and
   enable a right command allowing a cursor position to jump directly to the particular menu item from a different menu item of the plurality of menu items, the jump performed after a single application of the right command, wherein the different menu item does not have a restriction as to a position in the menu; and
in response to determining not to display the promotion, disable the right command.

16. The computer readable storage medium of claim 15, further comprising operational instructions executable by the processor to:
   receive a command to navigate to the content item; and
   retrieve the content item.

17. The computer readable storage medium of claim 15, further comprising operational instructions executable by the processor to receive the right command when the cursor position is at the different menu item while the promotion is displayed.

18. The computer readable storage medium of claim 15, further comprising operational instructions executable by the processor to display the different menu item with a non-cursor-position-indicating visual characteristic when the right command is received.

19. The computer readable storage medium of claim 15, further comprising operational instructions executable by the processor to display a cursor-position-indicating border that encompasses the promotion and encompasses the particular menu item to visually connect the promotion to the particular menu item when the right command is received.

20. The computer readable storage medium of claim 15, further comprising operational instructions executable by the processor to:
   receive a left command to move the cursor position from the particular menu item to the different menu item of the plurality of menu items;
   display the different menu item with a cursor-position-indicating visual characteristic; and
   display the particular menu item and the promotion without the link to visually disconnect the promotion from the particular menu item.

* * * * *